May 29, 1928.

G. P. WIEDMAN 1,671,457

AUTOMOBILE BODY CONSTRUCTION

Filed Oct. 29, 1925   4 Sheets-Sheet 1

WITNESSES

INVENTOR
George Phillip Wiedman
BY
ATTORNEYS

May 29, 1928.
G. P. WIEDMAN
1,671,457
AUTOMOBILE BODY CONSTRUCTION
Filed Oct. 29, 1925
4 Sheets-Sheet 2
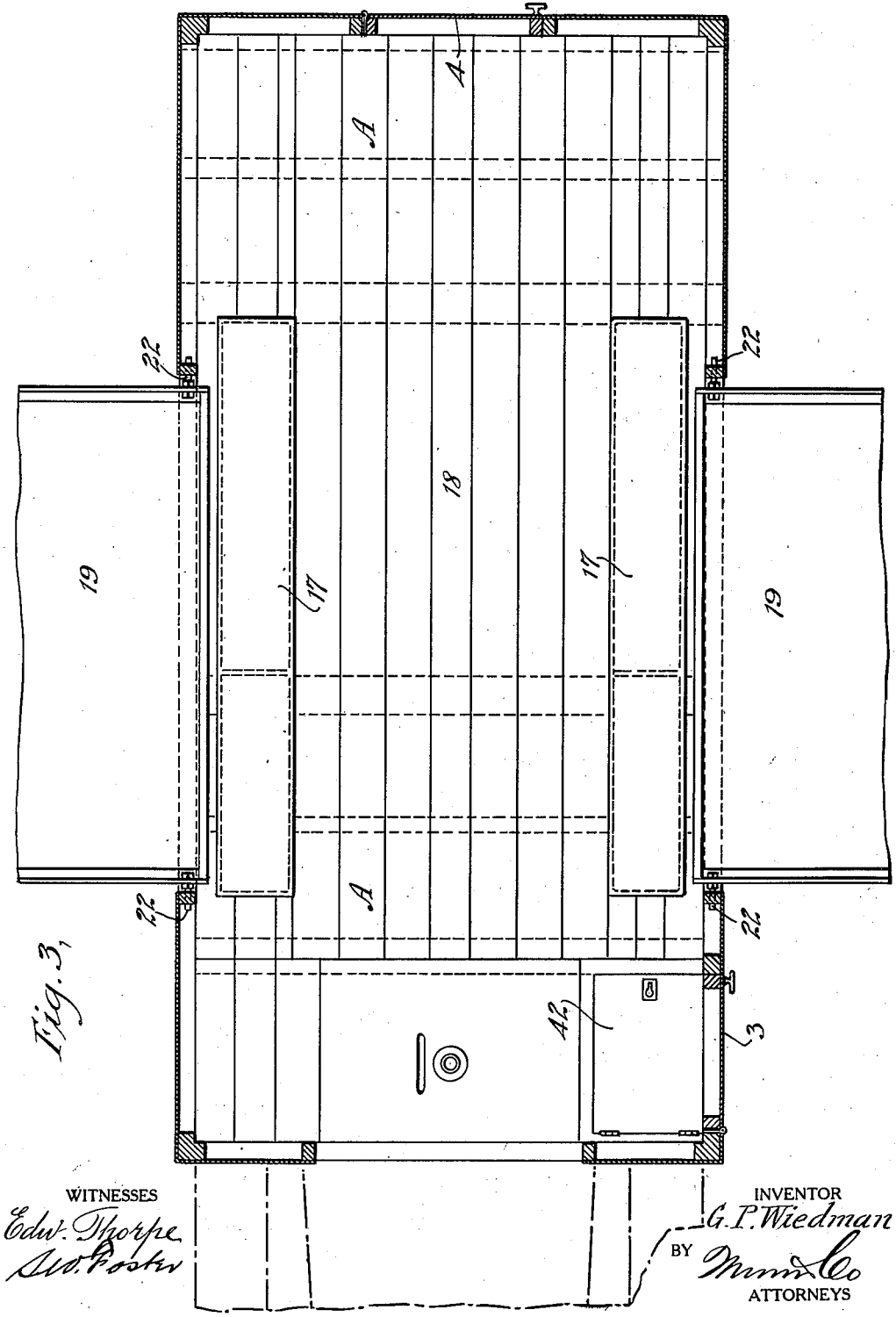

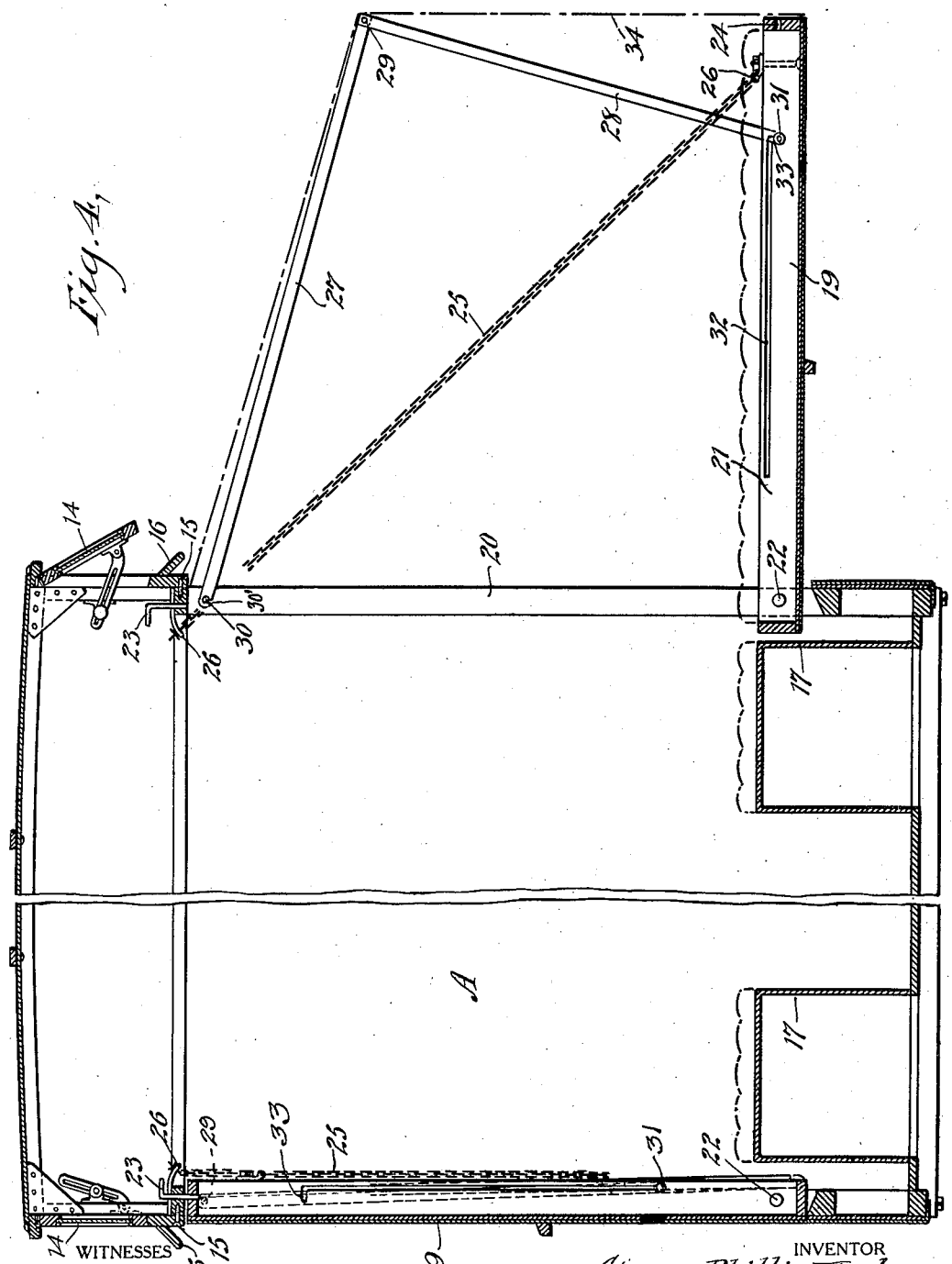

May 29, 1928.
G. P. WIEDMAN
AUTOMOBILE BODY CONSTRUCTION
Filed Oct. 29, 1925
4 Sheets-Sheet 4
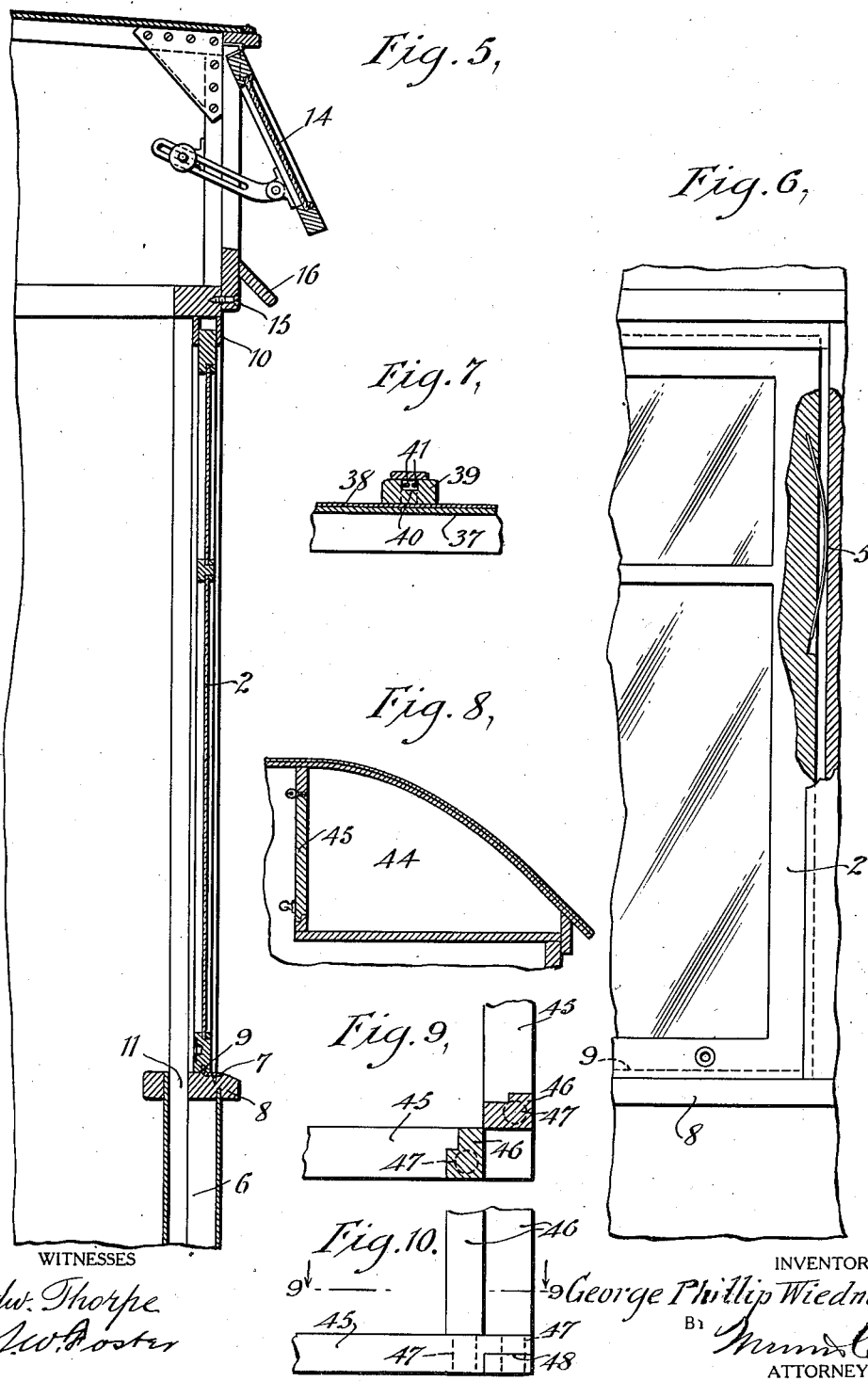

Patented May 29, 1928.

1,671,457

UNITED STATES PATENT OFFICE.

GEORGE PHILLIP WIEDMAN, OF NORTH TONAWANDA, NEW YORK.

AUTOMOBILE BODY CONSTRUCTION.

Application filed October 29, 1925. Serial No. 65,552.

This invention relates to automobile body construction, and more particularly to such a body designed for touring purposes.

An object of the invention is to provide a body of this character in which sleeping quarters may be provided by the lowering of hinged platforms, constituting portions of the sides of the body, and encase said platforms in suitable flexible housings.

A further object is to provide a body with platforms of the above character, which are securely held in either their extended or vertical positions, and which are provided with improved means for maintaining the cover in operative relation when positioned thereon.

A further object is to provide a body of this character in which the maximum space is utilized for practical purposes either while touring or while at rest, and which presents a neat and attractive appearance under all conditions.

A further object is to provide a body which may be used in connection with any automobile chassis and which will provide space for a family during travel or touring, so that the body is equally efficient, ornamental and attractive while touring as well as while in camp.

With these and other objects in view, the invention consists in certain novel features of construction and combinations and arrangements of parts, which will be more fully hereinafter described and pointed out in the claims.

In the accompanying drawings:—

Figure 3 is a sectional plan view of the body with parts broken away;

Figure 4 is a view in vertical transverse section through the body, showing one of the platforms lowered and the other in closed or upright position;

Figure 5 is a fragmentary view in longitudinal section through one of the windows and showing a side wall construction illustrating the lower window and the upper window ventilator;

Figure 6 is a fragmentary view in side elevation, partially in section, showing the spring for holding the window against rattling;

Figure 7 is a fragmentary view in transverse section through the center portion of the roof;

Figure 8 is a vertical longitudinal section through one end of the roof of the car.

Figure 9 is a sectional plan view illustrating one corner of the frame of the body, taken on the line 9—9 of Figure 10;

Figure 10 is a fragmentary view in elevation of one corner of the frame.

Figure 1:
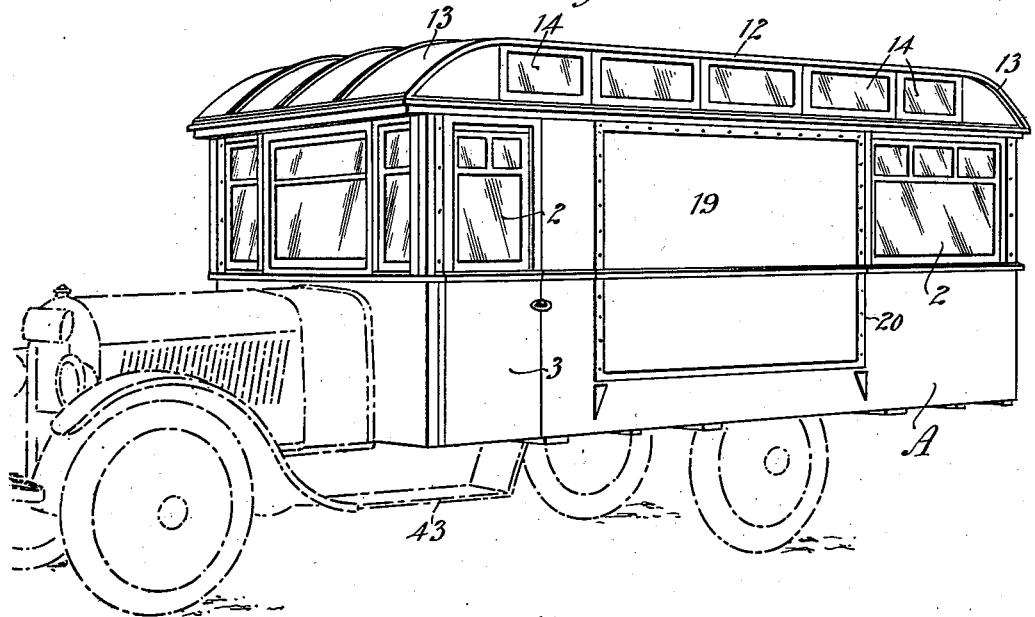
Figure 1 is a perspective view, showing my improved automobile body closed and ready for touring.
Figure 2:
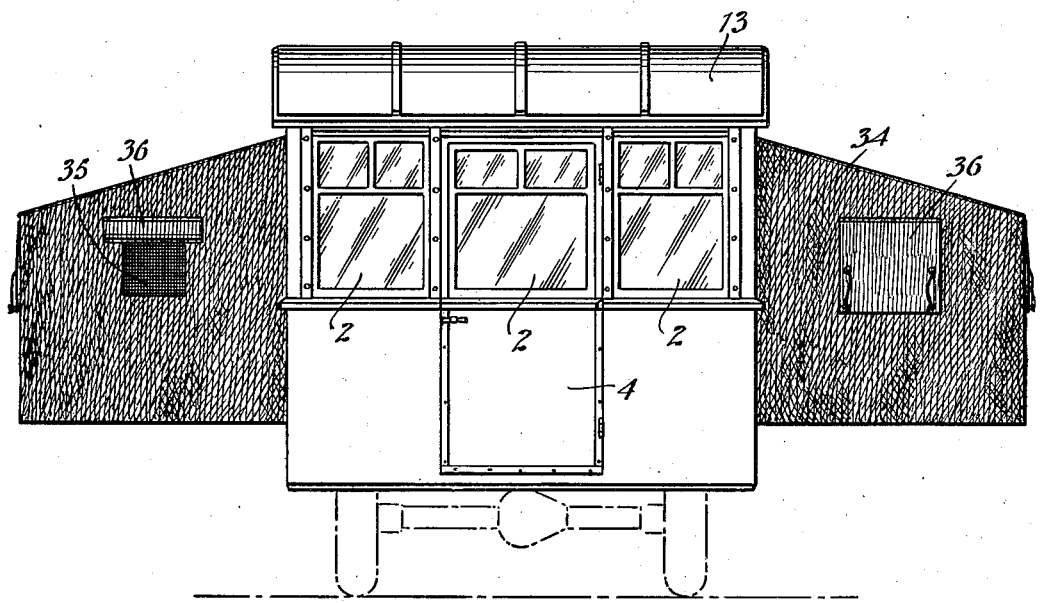
Figure 2 is a rear end view of the body, showing the same with the platforms extended and enclosed when the body is at rest or in camping position.

A represents my improved automobile body, which is provided with windows 2, and doors 3. I may have doors 3 in the sides at the front portion and I also have a door 4 at the rear of the body. The windows 2 are preferably in the form of sliding sashes, having bow spring anti-rattler 5 at their edges to hold them from rattling and render them waterproof. These windows or sashes 2 are designed to be lowered into pockets 6 in the body whenever it is desired to open them.

To render the same weatherproof and water-tight, I preferably provide metal weather strips 7 in the stills 8 and these weather strips extend into grooves 9 in the lower portions of the sashes when the latter are in their closed position. The guides 10 for the sashes or windows 2 allow for a certain amount of upward movement, as shown clearly in Figure 5, so as to release the sashes from the weather strips and allow them to be moved laterally into alinement with the entrances 11 and the pockets 6 when it is desired to open the windows.

The roof 12 of the body is of general inverted box-like form, having downwardly curved or tapering ends 13, with suitable hinged ventilating windows 14 in the sides of said structure so that these ventilators may be opened or closed at will.

This box-like roof structure is removably secured to the main portion of the body A by screws 15 so that it is removable as occasion may require. Inclined watersheds 16 are secured to the roof structure and overhang the joint between the same and the body so as to shed any water which may fall and prevent its passage through the joint.

Relatively long wheel housings 17 are provided on the floor 18 of the body, and these wheel housings can be utilized as benches or couches, as clearly shown.

In the opposite sides of the body I provide platforms 19 which normally close openings 20 in the side walls of the body to form a complete wall structure. These platforms 19 have upwardly extending flanges 21 along their edges, and the side flanges 21 are secured to the wall of the body A by means of pivot bolts 22, the latter being located adjacent the lower ends of the platforms so as to provide pivots and allow the platforms to swing from their normal vertical position outwardly to a horizontal position.

When in a vertical position, the platforms are locked by means of movable locking pins 23 movable in the upper walls of openings 20 and adapted to be projected through openings 24 in the free ends of platforms 19. Chains 25 connect the free ends of the platforms with brackets 26 at the upper portion of the body so as to provide support for said platforms when in their horizontally extended position.

When the platform is in open position, as shown in Figure 4, and it is desired to close the same, the links 27 are disconnected from their pivots 30 when the platform 21 is swung up to vertical position with the links lying against the platform. This latter position of the links is permitted when the link 28 is moved upwardly far enough to allow the pin 31 to ride in the slot 32. When the platform is swung down to horizontal position the links 27 are connected to the pivots 30 and the cover is thereby supported and held in stretched position.

At each side of each platform 19 a pair of links 27 and 28 is located. These links are pivotally connected as shown at 29, and links 27 are pivotally and removably connected to the body, as shown at 30. The free ends of the links 28 support laterally projecting pins 31 which are movable in slots 32 in the side flanges 21 of platforms 19, and said slots at their outer extremities extend downwardly, as shown at 33 so as to hold the links in their extended position.

Canvas or other flexible housings 34, which constitute in effect rooms or tents, are projected to fit over the platforms 19 and be held in extended normal shape by the links 27 and 28, as indicated clearly in Figure 4. These housings 34 are preferably formed with screened windows 35 and curtains 36 so as to provide the necessary light and air or to exclude the same as may be desired.

I have not illustrated any particular means for securing the housings to the body, but it is to be understood that I may employ any desired means for this purpose with the understanding that the housings are removable and can be folded or rolled and placed inside of the body when the platforms are in their upright closed position.

My invention is of course not limited to the details of construction of the body, but I preferably provide the roof structure or covering of fiber, as indicated at 37, with a waterproofing material 38 thereon. I also preferably provide longitudinal strengthening strips 39 secured on top of the roof, and at least one of these strips is grooved, as shown at 40, to accommodate electric wires 41 for wiring any desired lighting system within the body.

In order that the interior of the body may have a complete and full floor space, I provide hinged platforms 42 to cover the front steps 43 of the car.

As illustrated in Figures 9 and 10, it will be noted that I connect the sills 45 with stanchions 46 by mortise and tenon joints 47. These mortises and tenons are preferably of cylindrical form and tightly couple the parts and strengthen them, and the meeting ends of the sills have angular rabbeted joints 48 as clearly shown in Figure 10.

It will thus be noted that I provide an automombile body which not only utilizes the full floor space thereof in traveling but also provides extra rooms when the latter is in camp; and I have purposely refrained from illustrating ornamental or useful features such as curtains, decorations and the like which make this body extremely ornamental and useful and add to the privacy of the car when in camp.

As packing and storing space in the body is extremely desirable, I utilize the end portions of the roof structure for this purpose, as clearly indicated in Figure 8. I accomplish this by providing hinged portions 45 extending across the roof structure and constituting closures for compartments 44 at the ends of the roof structure. Other storage space and compartments may of course be provided and various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. An automobile top of the character described, having an opening in its wall, a platform hingedly connected to said wall and adapted to close said opening, said platform adapted to be swung outwardly and downwardly to horizontal position, a pair of connected links at each side of the platform, one link of each pair removably connected to the body and the other link of each pair removably connected to the platform through the medium of slots in the platform, and pins on the links, said platform having recesses at the outer ends of the slots to receive the pins.

2. An automobile body of the character described, having an opening in its wall, a platform hingedly connected to said wall and adapted to close said opening, said platform adapted to be swung outwardly and downwardly to horizontal position, a pair of connected links at each side of the platform, one link of each pair removably connected to the body and the other link of each pair removably connected to the platform through the medium of slots in the platform, pins on the links, said platform having recesses at the outer ends of the slots to receive the pins, flexible devices connecting the outer ends of the platform with the upper portion of the body, and means for locking the platform in closing position.

GEORGE PHILLIP WIEDMAN.